United States Patent [19]
Isoda et al.

[11] Patent Number: 5,900,873
[45] Date of Patent: May 4, 1999

[54] INFORMATION PROCESSING DEVICE AND INFORMATION PROCESSING METHOD

[75] Inventors: Hiroshi Isoda, Ikoma-gun; Toshio Isoe, Tenri, both of Japan

[73] Assignee: Sharp Kabushiki Kaisha, Osaka, Japan

[21] Appl. No.: 08/991,798

[22] Filed: Dec. 16, 1997

[30] Foreign Application Priority Data

Dec. 18, 1996 [JP] Japan .................................. 8-337791

[51] Int. Cl.⁶ ...................................................... G06F 3/14
[52] U.S. Cl. .......................... 345/344; 345/342; 345/345
[58] Field of Search .................................... 345/340, 341, 345/342, 343, 344, 345

[56] References Cited

U.S. PATENT DOCUMENTS

| | | | |
|---|---|---|---|
| 4,868,765 | 9/1989 | Diefendorff | 345/345 |
| 5,046,001 | 9/1991 | Barber et al. | 345/345 |
| 5,463,728 | 10/1995 | Blahut et al. | 345/344 |
| 5,689,666 | 11/1997 | Berquist et al. | 345/345 |
| 5,764,229 | 6/1998 | Bennett | 345/345 |

FOREIGN PATENT DOCUMENTS 2-176825  7/1990  Japan .

*Primary Examiner*—Raymond J. Bayerl
*Assistant Examiner*—Chadwick A. Jackson
*Attorney, Agent, or Firm*—Nixon & Vanderhye P.C.

[57] ABSTRACT

In an information processing device, in the case where a window is edited by a user referring to data of a window which is positioned behind all the other displayed windows, the window to be referred to is touched, a function key displayed on the left bottom corner of the display screen is pressed, and a portion of the window to be referred to is dragged by a pen so as to specify a region to be referred to. This allows the portion of the window specified by the pen to be displayed in front of the window to be edited. As a result, in the case where editing of data is carried out on an active window referring to a window which is not an active window, the window to be referred to and the window to be edited are both clearly recognized without carrying out a complicated operation.

9 Claims, 11 Drawing Sheets

INFORMATION PROCESSING DEVICE AND INFORMATION PROCESSING METHOD

FIELD OF THE INVENTION

The present invention relates to an information processing device and an information processing method for displaying a multiwindow, and more particularly to an information processing device and an information processing method for displaying a reference window and an active window in an overlapped manner.

BACKGROUND OF THE INVENTION

Japanese Unexamined Patent publication No. 176825/1990 (Tokukaihei 2-176825) discloses an image information display device, adopting the raster scan system for displaying a multiwindow, which, when displaying a window overlapping with another, determines the priorities of the displayed windows by detecting a start point and an end point on the scanning lines of a window.

However, in the conventional technology, in the case of carrying out editing of data of an active window referring to a window other than the active window, a problem exists in that the window to be edited is shadowed by the reference window so that it is difficult to carry out an editing operation. Thus, in the conventional technology, an operation for moving and scaling of the window to be referred to or the window to be edited is required. This makes the operation of the device complicated.

SUMMARY OF THE INVENTION

It is an object of the present invention to provide an information processing device and an information processing method, which permit, in a multi-window display, an operation such as editing of a window to be carried out with ease referring to another window with an improved operativity of the windows.

In order to achieve the above-mentioned object, a first information processing device of the present invention includes a storing section for storing information about a plurality of windows, a window controlling section for controlling priority orders of the windows stored in the storing section, a displaying section for displaying the windows stored in the storing section in accordance with the control by the window controlling section, a selecting section for arbitrarily selecting a window from the windows displayed by the displaying section, a making section for making a highest priority window by specifying a display region of the window selected by the selecting section, a positioning section for positioning the window as selected by the selecting section, behind all displayed windows, a display changing section for changing a display position or a display region of the highest priority window as made by the making section, and a display information changing section for changing, in response to a change in the display position or a change in the display region of the highest priority window by the display changing section, display information of the highest priority window in accordance with display information of the window as positioned behind all the displayed windows by the positioning section.

In this first arrangement, (1) a window is arbitrarily selected from the displayed windows, (2) a display region of the selected window is specified, (3) the highest priority window is made from the specified region, (4) the selected window is positioned behind all the other displayed windows, and (5) when the display position or the display region of the highest priority window is changed, the display information of the highest priority window is changed in accordance with the display information of the window thus positioned behind all the other displayed windows. Namely, (a) a portion of a window to be referred to is selected from windows other than the active window, (b) the highest priority window is made from the selected portion, and (c) the display information of the highest priority window is changed when the display position or the display region of the highest priority window is changed, in accordance with the display information of the window to be referred to. As a result, it is possible to carry out with ease an operation on a window referring to another window with an improved operativity.

In the first information processing device, it is possible to erase the highest priority window by an easy operation by providing a first erasing section for erasing a display of the highest priority window in response to a change by the display changing section, when the display region of the highest priority window protrudes at least partially from a display region of the window positioned behind all the other displayed windows by the positioning section.

In order to achieve the above-mentioned object, a second information processing device of the present invention includes a storing section for storing information about a plurality of windows, a displaying section for displaying the windows stored in the storing section in accordance with the control by the window controlling section, a selecting section for arbitrarily selecting a window from the windows displayed on the displaying section, a making section for specifying a display region of the window selected by the selecting section, and for making a highest priority window from the specified region, and a positioning section for positioning the window as selected by the selecting section behind all the other displayed windows.

In this second arrangement, (1) a window is arbitrarily selected from the displayed windows, (2) a display region of the selected window is specified, (3) the highest priority window is made from the specified region, and (4) the selected window is positioned behind all the other displayed windows. This makes it possible to select a window to be referred to from windows other than the active window so as to make, as the highest priority window, a new window having the information of the referring window. As a result, it is easier to carry out editing of data on a window referring to another window with an improved operativity.

In the second information processing device, it is possible to realize a desirable data editing screen if the highest priority window is movable, since this allows (1) the active window to be edited without being hidden by the highest priority window and (2) the information of the window to be referred to to be recognized.

Also, in the second information processing device, it is possible to erase the highest priority window by an easy operation by providing a second erasing section for erasing a display of the highest priority window in response to specifying of the window as positioned behind all the other displayed windows by the positioning section.

Further, in the first and second information processing devices, it is possible to realize a desirable window display operation if (1) the highest priority window and (2) the window as positioned behind all the other displayed windows by the positioning section have a same frame color.

In order to achieve the above-mentioned object, a third information processing device of the present invention includes a multi-window displaying section for displaying, on a display screen of a display, a plurality of windows including an active window, a selecting section for selecting a window other than the active window, as a reference window to be referred to when editing the active window, a region specifying section for specifying a partial region of the reference window as selected by the selecting section, and a making section for making, in front of the active window, a new window which displays information of the specified region of the reference window in accordance with the specification by the region specifying section.

In this third arrangement, since the new window, which is a portion of the reference window, is made in front of the active window, compared with the case where the reference window is positioned side by side with the active window, it is possible to reduce the area of the display screen required for displaying the windows.

Also, in the third arrangement, it is possible to make a smaller new window by specifying only the region of the reference window to be referred to. Thus, the problem that editing of the active window is made difficult by hiding the new window is avoided.

Further, in the third arrangement, the new window is made only by specifying a portion of the reference window by the region specifying section, thereby making the operation simple.

In order to achieve the above-mentioned object, an information processing method of the present invention includes the steps of displaying the plurality of windows including the active window, selecting a window other than the active window, as a reference window to be referred to when editing the active window, specifying a partial region of the selected reference window, and making, in front of the active window, a new window which displays information of the specified region of the reference window in accordance with the specification by the specifying of the region.

In this method, since the new window, which is a portion of the reference window specified by the region specifying section, is made in front of the active window, it is possible to (1) edit the active window without being hidden by the new window and (2) reduce the area of the display screen required for displaying of the windows.

For a fuller understanding of the nature and advantages of the invention, reference should be made to the ensuing detailed description taken in conjunction with the accompanying drawings.

DESCRIPTION OF THE EMBODIMENTS

Figure 1:
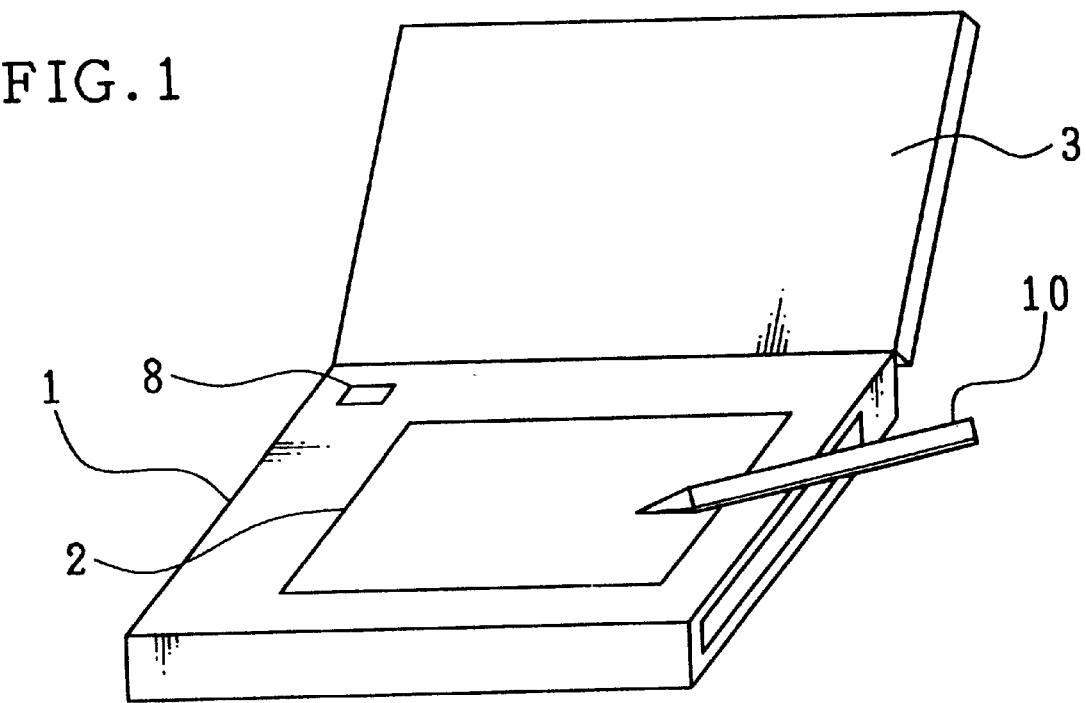
FIG. 1 is an external perspective view showing an information processing device in accordance with one embodiment of the present invention.
Figure 2:
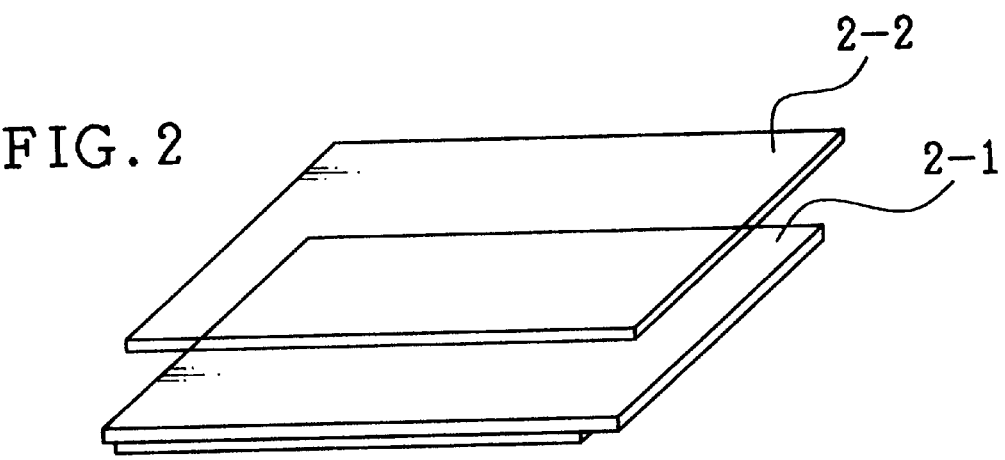
FIG. 2 is an exploded perspective view showing an input-output section of the information processing device of FIG. 1.
Figure 3:
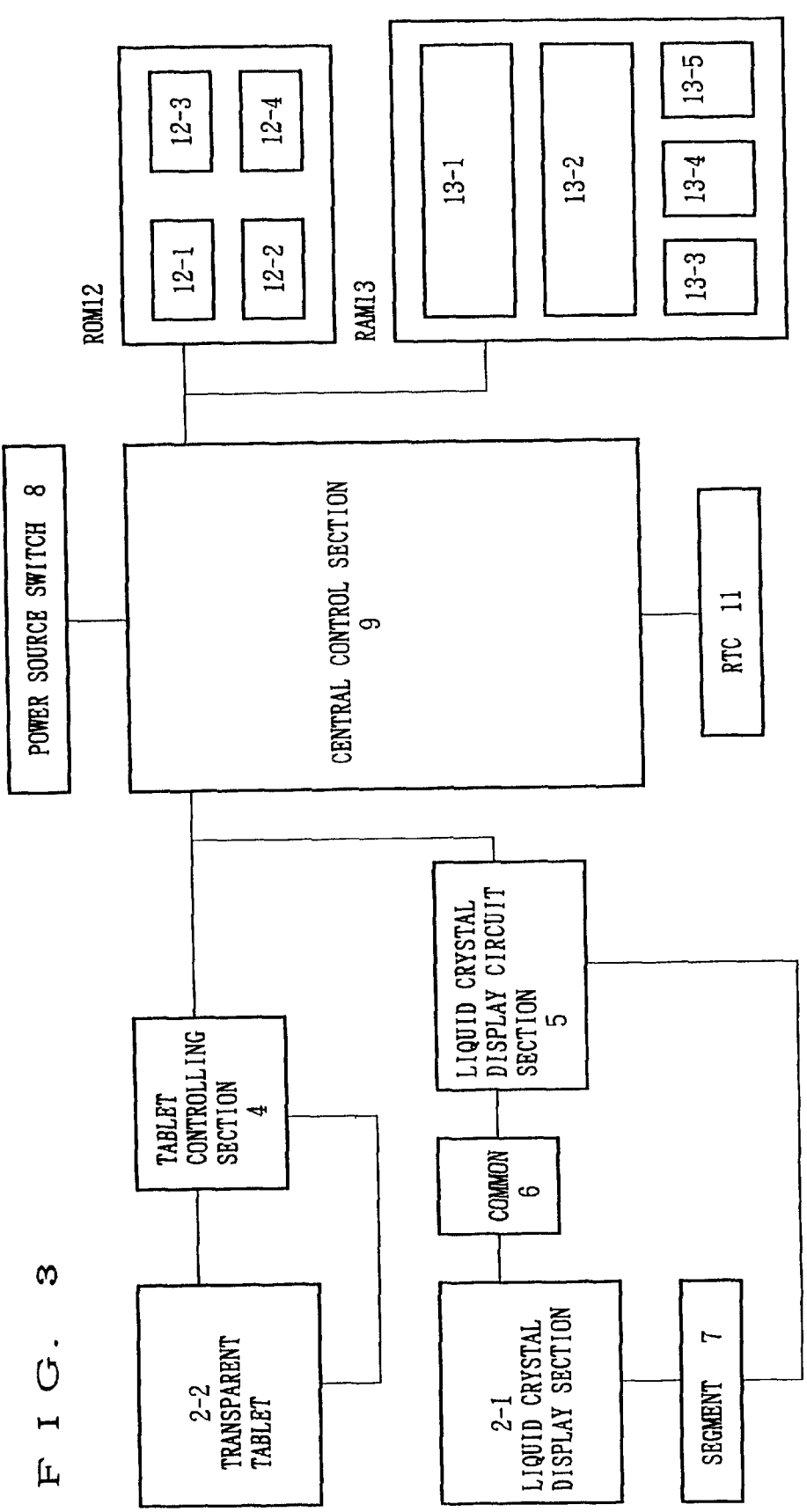
FIG. 3 is a block diagram showing the information processing device of FIG. 1.
Figure 4:
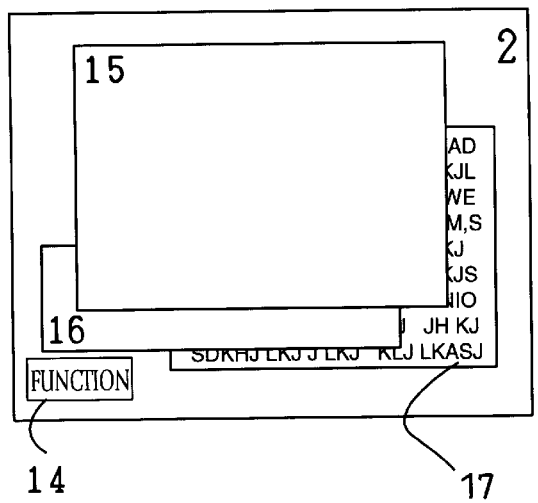
FIG. 4(a) through FIG. 4(f) are drawings explaining a window displaying process of the information processing device of a first embodiment of the present invention.
Figure 4:
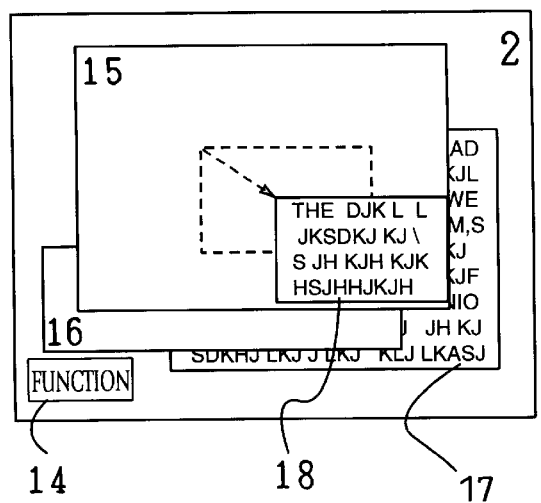
Figure 4:
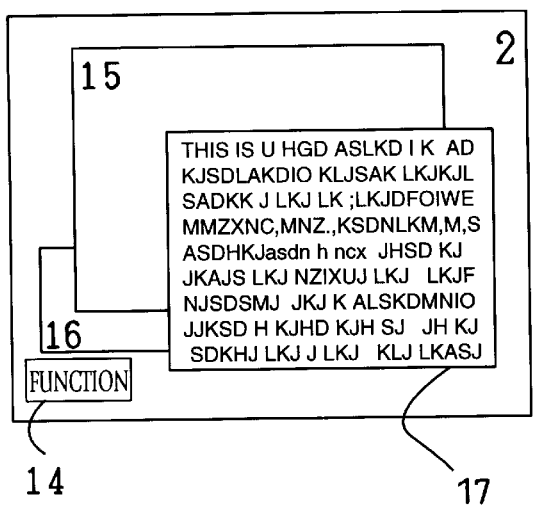
Figure 4:
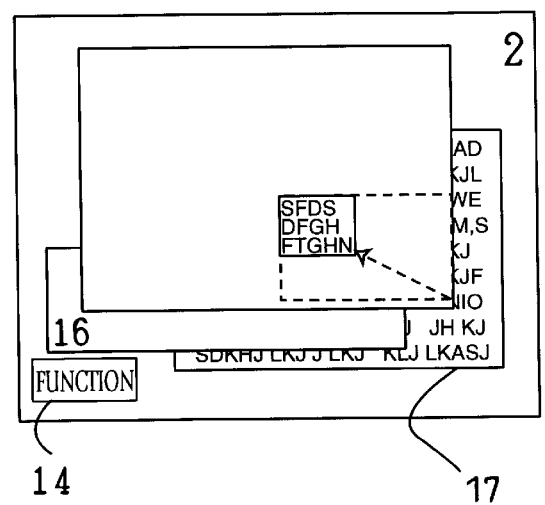
Figure 4:
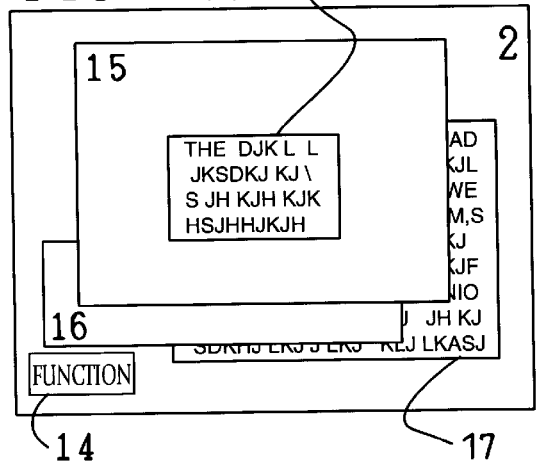
Figure 4:
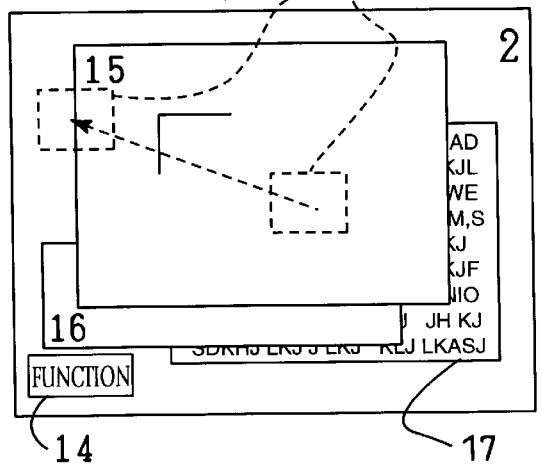

The following will describe one embodiment of an information processing device of the present invention referring to FIG. 1 through FIG. 3. Note that, the present invention is not limited to the following arrangement.

FIG. 1 is an exterior perspective view of an information processing device of the present embodiment. The information processing device of the present embodiment is provided with a cabinet section (main body) 1, an input-output section 2, a cover section 3, and a pen 10.

The cabinet section 1 is provided with an IR ray communicating section, a pen holder, etc. (not shown), and stores inside (1) the input-output section 2 composed of a liquid crystal display section 2-1 and a transparent tablet 2—2 integrated with each other, and (2) a control circuit for controlling an interface, etc., or (3) a power source section for supplying power to a part requiring power, such as the IR ray communicating section, etc. The input-output section 2 will be described later in more detail referring to FIG. 2.

The cover section 3 is attached to the back surface of the cabinet section 1 via a hinge (not shown) so that the cover section 3 can rotate on the hinge to a position, covering the input-output section 2. The cover section 3 is provided for protecting the input-output section 2 when carrying the information processing device.

A power source switch is provided for turning on or turning off a main power source. The pen 10 is provided for inputting characters and patterns to the transparent tablet 2—2.

FIG. 2 is an exploded perspective view of the input-output section 2. The input-output section 2 is an integrated unit composed of (1) the thin liquid crystal display section 2-1 of the matrix type capable of displaying characters, etc., and (2) the transparent tablet 2—2 having a size large enough to cover the liquid crystal display section 2-1. Note that, it is possible to provide, as required, a backlight composed of an EL (electroluminescence) panel or other panels on the rear surface of the liquid crystal display section 2-1.

The transparent tablet 2—2 has an arrangement wherein, for example, a large number of transparent electrodes are provided respectively on the inner surfaces of two transparent sheets provided parallel to each other with a spacing therebetween, and on the respective inner surfaces of the transparent sheets, small projecting spacers are orderly printed in order to prevent the transparent electrodes from contacting with each other under a normal condition. With this arrangement, when a position on the transparent tablet 2—2 is pointed by a finger or the pen 10 (see FIG. 10), the transparent electrodes on a transparent sheet contact the transparent electrodes of another transparent sheet at the pointed position, thereby making it possible to detect the position as selected in the described manner.

Also, in the transparent tablet 2—2, the position information on the transparent tablet 2—2 and the position information of display contents displayed on the liquid crystal display section 2-1 are synchronized. This makes it possible to detect the position on the liquid crystal display section 2-1 selected by a user.

FIG. 3 is a block diagram showing the entire information processing device of the present embodiment. The information processing device of the present invention is provided with the liquid crystal display section (display) 2-1, the transparent tablet (coordinates position specifying means) 2—2, a tablet controlling section 4, a liquid crystal display circuit section 5, a common circuit 6, a segment circuit 7, a power source switch 8, a central controlling section 9, an RTC (Real-Time Clock) 11, a ROM (Read-Only Memory) 12, and a RAM (Random Access Memory) 13.

The tablet controlling section 4 extracts coordinates information from the transparent tablet 2—2. The tablet controlling section 4 is connected to the transparent electrodes respectively provided on the transparent sheets of the transparent tablet 2—2 so as to detect the coordinates position pointed by the finger or the pen 10 (see FIG. 1).

The liquid crystal display circuit section 5 stores, as a bit map, the location of a dot illuminating liquid crystal, and sends a signal to the common circuit 6 and the segment circuit 7 as required.

The central controlling section 9 controls input information or output information in response to various commands.

The RTC 11 clocks time based on a clock signal (not shown) so as to output the current year, month, date, and time (hour, minute, second).

The ROM 12 is provided with (1) a program area 12-1 storing a program for controlling the operation of the central controlling section 8, (2) a calendar information program area 12-2 storing calendar information for calculating a date, (3) a font information area 12-3 storing information about character font to be displayed on the liquid crystal display section 2-1, and (4) a coordinates conversion storing area 12-4 for storing conversion information for converting the coordinates detected by the tablet controlling section 4 into coordinates of the display position.

The RAM (storing means) 13 is provided with (1) a data storing section 13-1 for storing various data such as characters or patterns inputted from the input-output section 2 by the user, (2) a window information storing section 13-2 for storing various window information, (3) a start coordinates storing section 13-3 for temporarily storing the position on the input-output section 2 where the pen 10 comes in touch with the input-output section 2, (4) an end coordinates storing section 13-4 for temporarily storing the position on the input-output section 2 where the pen 10 loses the touch, and (5) a function flag 13-5 for indicating whether a function key is pressed.

Note that, the window information storing section 13-2 stores 0-rank window (highest priority window) information, other-window information, and data to be displayed on windows. [First Embodiment]

The following will describe one embodiment of the information processing device having the described arrangement referring to FIG. 4(a) through FIG. 4(f) and FIG. 5 through FIG. 8.

FIG. 4(a) through FIG. 4(f) show a window displaying process of the present embodiment. FIG. 4(a) shows a display screen of the input-output section 2 when a plurality of windows 15, 16, and 17 are opened. In the display screen, the window 15 is displayed in front of all the other windows, the window 16 is displayed behind the window 15, and the window 17 is displayed on the backmost side. Note that, in FIG. 4(a) through FIG. 4(f), displayed characters on the windows 15 and 16 are omitted.

Here, in the case where the user carries out editing of the window 15 referring to the data of the window 17 displayed on the backmost side, first, the window 17 to be referred to is touched by the pen 10 (see FIG. 1). The window 17 thus touched by the pen 10, as shown in FIG. 4(b), is displayed in front.

Then, the user presses a function key 14 displayed on the left bottom corner of the display screen of the input-output section 2, and by dragging the pen 10, a portion of the window 17 is specified as a range to be referred to. Note that, the range is specified by dragging of the pen 10 in such a manner, for example, that the upper left apex of the referring portion and the bottom right apex of the referring portion are respectively specified as a start point and an end point.

When the user finishes specifying the range by lifting the pen 10, as shown in FIG. 4(c), the window 17 is displayed on the backmost side behind all the displayed windows, and a new window 18, which is the portion of the window 17 specified as the range to be referred to, is displayed in front of the window 15 to be edited. Here, although not shown, the respective frame colors of the windows 17 and 18 are changed from black to red. The frame color of the other windows remains black.

Also, here, because the window 15 is an active window, the user is able to edit the data of the window 15 referring to the data contents of the window 18.

When the reference to the data contents of the current window 18 is finished while editing the data of the window 15 in FIG. 4(c), and when another reference to the window 17 is desired by the user, as shown in FIG. 4(d), the window 18 is moved to a portion of the window 17 to be referred to by dragging a position on the window 18 other than a corner and the frame by the pen 10. This displays another portion of the window 17 as the window 18.

Also, in the case where the user requires the window 18 only partially or desires the range of the window 18 to be enlarged, as shown in FIG. 4(e), by dragging a corner or the frame of the window 18 by the pen 10, it is possible to change the size of the window 18 as desired by the user.

In order to finish the reference to the window 18 made in the described manner, as shown in FIG. 4(f), the window 18 is moved by dragging a position on the window 18 other than a corner and the frame by the pen 10 so that the window 18 thus moved protrudes at least partially from the range of the window 17, thereby making it possible to erase the window 18.

Figure 5:
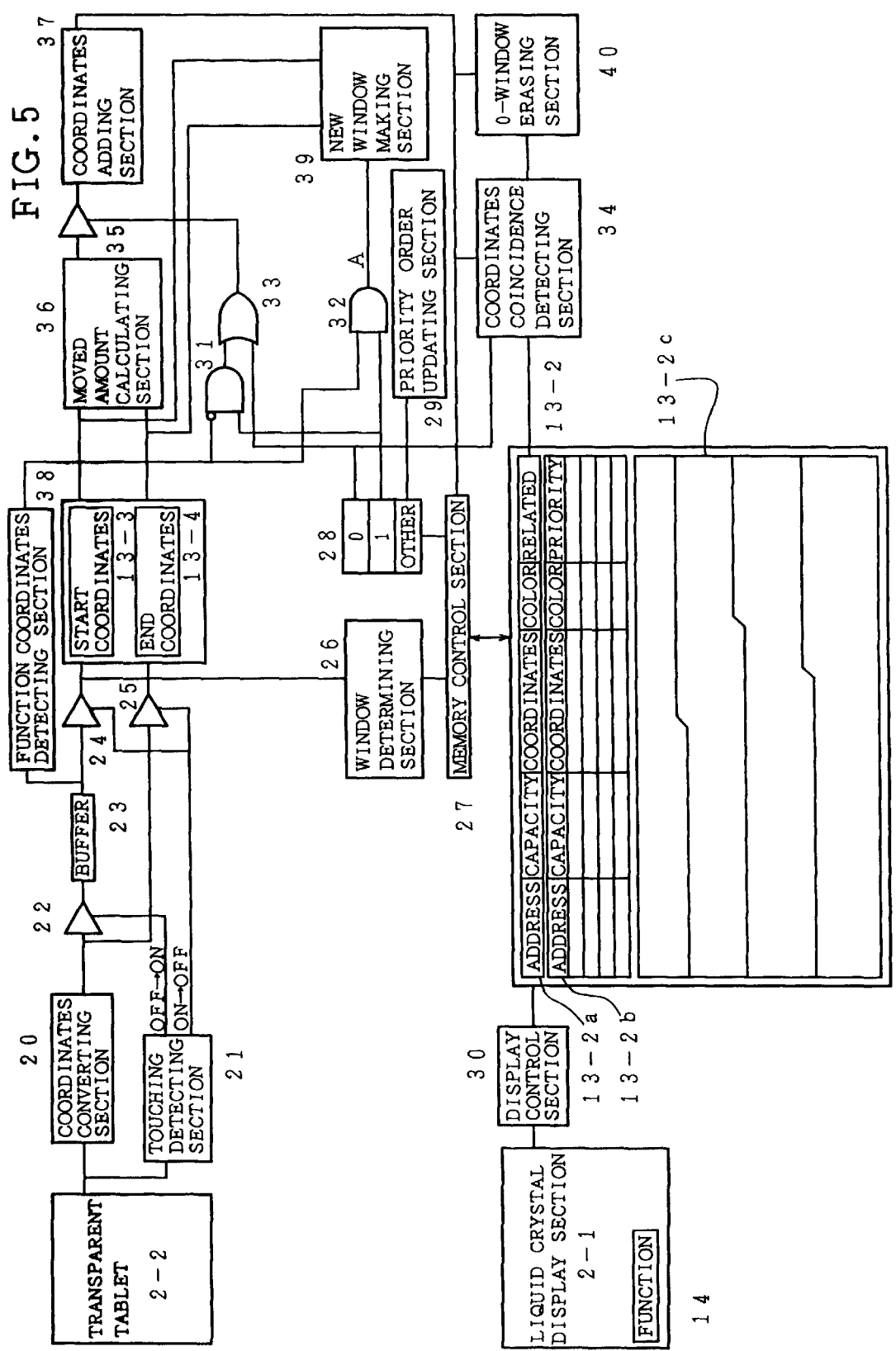
FIG. 5 is a detailed block diagram showing the information processing device of the first embodiment of the present invention.

The following will describe the described operations referring to the detailed block diagram of FIG. 5. First, a process for selecting and moving windows will be described.

In the present information processing device, an active window is given a priority order of "1", and a window in front of the active window is given a priority order of "0", and windows behind the active window are given priority orders of "2", "3", . . . , and so on from the front side.

In the following explanations, a window having the highest priority order (priority) will be called a 0-rank window, and a window having the second highest priority order will be called a 1-rank window, and the following windows having descending priority orders will be called a 2-rank window, a 3-rank window, . . . , and so on. Also, windows having priority orders lower than the 2-rank window will be called other-windows.

When the user touches the transparent tablet 2—2 with the pen 10, a voltage in accordance with the touched position is outputted to a coordinates converting section 20 and a touching detecting section 21 from the transparent tablet 2—2. The coordinates converting section 20 converts the voltage into coordinates so as to output the coordinates to a gate 22 and a gate 25 as a voltage.

The touching detecting section 21, when the pen 10 comes in touch with the transparent tablet 2—2, namely, when the voltage is turned on, outputs a signal to the gate 22 so as to open the gate 22 in accordance with the voltage from the transparent tablet 2—2. On the other hand, when the pen 10 loses the touch with the transparent tablet 2—2, namely, when the voltage is turned off, the touching detecting section 21 outputs a signal to a gate 24 and the gate 25 so as to open the gate 24 and the gate 25.

Supposing that the pen 10 points a certain position on the transparent tablet 2—2, the voltage outputted from the transparent tablet 2—2 is converted into coordinates by the coordinates converting section 20. The touching detecting section 21 detects that the voltage outputted from the transparent tablet 2—2 is turned on, and opens the gate 22. In response to this, the coordinates in the coordinates converting section 20 is stored in a buffer 23 via the gate 22. Namely, the position on the transparent tablet 2—2 pointed by the pen 10 is stored in the buffer 23 as coordinates.

When the pen 10 loses the touch with the transparent tablet 2—2, the touching detecting section 21 outputs a signal to the gate 24 and the gate 25 so as to open the gates 24 and 25. The gate 24 thus opened allows the coordinates stored in the buffer 23 to be stored in a start coordinates storing section 13-3. Also, the gate 25 thus opened allows the coordinates of a position where the pen 10 loses the touch with the transparent tablet 2—2 outputted from the coordinates converting section 20 to be stored in an end coordinates storing section 13-4. The coordinates outputted from the buffer 23 via the gate 24 are also outputted to a window determining section (window determining means) 26. Note that, in the present embodiment, the transparent tablet 2—2, the coordinates converting section 20, the touching detecting section 21, and the buffer 23 constitute range specifying means.

The window determining section 26 accesses a window information storing section 13-2 via a memory control section (display information changing means) 27. The window information storing section 13-2 includes a display information storing section 13-2c for storing information of characters and patterns to be displayed in each window, an other-window information storing section 13-2b storing information of windows other than the 0-rank window, and a 0-rank window information storing section 13-2a for storing information of the 0-rank window (highest priority window).

The other-window information storing section 13-2b includes (1) a part ("address" part in FIG. 5) for storing an address of the display information storing section 13-2c where information to be displayed in each window other than the 0-rank window starts to be stored, (2) a part ("capacity" part in FIG. 5) for storing a memory capacity, (3) a part ("coordinates" part in FIG. 5) for storing window coordinates when displaying each window other than the 0-rank window on the liquid crystal display section 2-1, (4) a part ("color" part in FIG. 5) for storing displaying color of each window other than the 0-rank window, and (5) a part ("priority" part in FIG. 5) for storing a priority order of each window other than the 0-rank window.

The 0-rank window information storing section 13-2a, in the same manner as the other-window information storing section 13-2b, includes an "address" part, a "capacity" part, a "coordinates" part, and a "color" part. In addition to these parts, the 0-rank window information storing section 13-2a also includes a part ("related" part in FIG. 5) for storing related information which is a priority order of a window related to the 0-rank window.

The window determining section 26 determines, as a selected window, a window corresponding to an inputted coordinates position. The memory control section 27 detects, from the other-window information storing section 13-2b, information such as a priority order, with regard to the window corresponding to the coordinates position inputted to the window determining section 26. The priority order of the window thus detected by the memory detecting section 27 is then outputted to a window selecting section 28. Note that, in the present embodiment, the transparent tablet 2—2, the coordinates converting section 20, the window determining section 26 and the window selecting section 28 constitute selecting means.

In the case where the selected window is a window other than the 0-rank window and the 1-rank window, a signal is outputted to a priority order updating section (controlling means, positioning means) 29 from an other-rank part ("other" in FIG. 5) of the window selecting section 28. The priority order updating section 29, upon receiving the signal, updates the priority order of the selected window to "1", and accordingly updates the display priority orders of windows other than the selected window by respectively adding "1". A display control section 30 then changes the display information of the liquid crystal display section 2-1 in accordance with the updated information of the display priority orders. Note that, in the present embodiment, the liquid crystal display section 2-1 and the display control section 30 constitute displaying means.

Here, because no signal is outputted from a 0-rank part ("0" in FIG. 5) and a 1-rank part ("1" in FIG. 5) of the window selecting section 28, only either one of the respective two input terminals of an AND circuit 31 and an AND circuit 32 receives a signal. For this reason, regardless of the input signal received by the respective input terminals of the AND circuit 31 and the AND circuit 32, no signals are outputted from the AND circuit 31 and the AND circuit 32.

In the case where the selected window is a 0-rank window, a signal is outputted to an OR circuit 33 and a coordinates coincidence detecting section 34 from the 0-rank part of the window selecting section 28. The OR circuit 33, upon receiving the signal through one of its input terminals, outputs a signal for opening a gate 35, regardless of the signal received by the other input terminal. The gate 35 thus opened allows the difference between the start coordinates and the end coordinates to be sent to a coordinates adding section 37 from a moved amount calculating section 36. The difference between the start coordinates and the end coordinates is calculated by the moved amount calculating section 36 according to a start coordinates value and an end coordinates value respectively stored in the start coordinates storing section 13-3 and the end coordinates storing section 13-4. The coordinates adding section 37 adds the value calculated in the moved amount calculating section 36 to the display coordinates in the 0-rank window information storing section 13-2a so as to update the display coordinates of the 0-rank window information.

In the case where the 1-rank window is selected while the detection of function key coordinates is not carried out in a function coordinates detecting section 38, the OR circuit 33 also receives a signal from the AND circuit 31 in response to a signal from the 1-rank part of the window selecting section 28 so that the gate 35 is opened by the OR circuit 33. This, as in the 0-rank window, makes it possible to update the display information of the 1-rank window so as to move the 1-rank window.

Note that, in the described information processing device, it is possible to change the size of all the windows by conventionally known techniques. Namely, when it is detected that the coordinates of a corner (or a frame) of the window stored in the window information storing section 13-2 coincides with the start coordinates stored in the start coordinates storing section 13-3, the coordinates of the corner (or frame) of the window coincident with the start coordinates in the window information storing section 13-2 are replaced with the end coordinates value stored in the end coordinates storing section 13-4. Note that, the coordinates of the corner (or frame) of the window coincident with the start coordinates are not replaced.

Also, in the described information processing device, the coordinates converting section 20, the touching detecting section 21, the buffer 23, the moved amount calculating section 36, and the coordinates adding section 37 constitute display changing means (window moving means, window size changing means).

The following will describe the operation when a coordinates position corresponding to the function key 14 is pressed by the pen 10.

First, the coordinates stored in the buffer 23 are outputted to a function coordinates detecting section 38. In the function coordinates detecting section 38, it is judged whether the position touched by the pen 10 is on the coordinates where the function key 14 is displayed. When it is judged that the position touched by the pen 10 is on the coordinates where the function key 14 is displayed, a signal "1" is outputted to the AND circuit 31 from the function coordinates detecting section 38 and inverted so as to be received by the AND circuit 31 as an inverted signal "0". The function coordinates detecting section 38 also outputs a signal to the AND circuit 32.

When the 0-rank window (window 18 in FIG. 4(c)) is pointed by the pen 10 after touching the coordinates on the function key 14, the 0-rank window is specified by the window determining section 26, and a signal "1" is outputted to the OR circuit 33 from the 0-rank part of the window selecting section 28, thereby opening the gate 35, and a moving process is carried out with respect to the 0-rank window. Here, the coordinates of the 0-rank window after it is moved are stored in the "coordinates" part of the 0-rank window information storing section 13-2a.

When the 1-rank window (window 15 in FIG. 4(a) and FIG. 4(c), or window 17 in FIG. 4(b)) is pointed by the pen 10, the 1-rank window is specified by the window determining section 26, and a signal "1" is outputted to the AND circuit 32 from the 1-rank part of the window selecting section 28. In the AND circuit 32, a signal A is outputted to a new window making section 39 according to a signal from the function coordinates detecting section 38 and the signal "1" from the 1-rank part of the window selecting section 28. The new window making section 39 also receives coordinates values respectively stored in the start coordinates storing section 13-3 and the end coordinates storing section 13-4. The new window making section 39 carries out a process for making the 0-rank window which will be described later in detail referring to FIG. 6.

When an other-window (windows 16 and 17 in FIG. 4(a) and FIG. 4(c), or windows 15 and 16 in FIG. 4(b)) is pointed by the pen 10, the other-window is specified by the window determining section 26, and a signal "1" is outputted to the priority order updating section 29 from the other-rank part of the window selecting section 28. When the signal "1" is inputted to the priority order updating section 29, the memory control section 27 sets to "1" the priority order of the specified other-window stored in the other-window information storing section 13-2b, and updates the display priority order of the 1-rank window to "2".

In order to erase the 0-rank window, as shown in FIG. 4(e), the window 18 is dragged by the user so that the window 18 protrudes at least partially from the range of the window 17. The process for this is carried out in the following manner.

In the present information processing device, (1) the coordinates values of the 0-rank window information storing section 13-2a and (2) the coordinates values in the other-window information storing section 13-2b corresponding to the window related to the 0-rank window information are compared in the coordinates coincidence detecting section 34, and in the case it is judged that the coordinates values of the 0-rank window are not within the coordinates values of the related window, the 0-rank window is erased by a 0-rank window erasing section (first window erasing means) 40.

Figure 6:
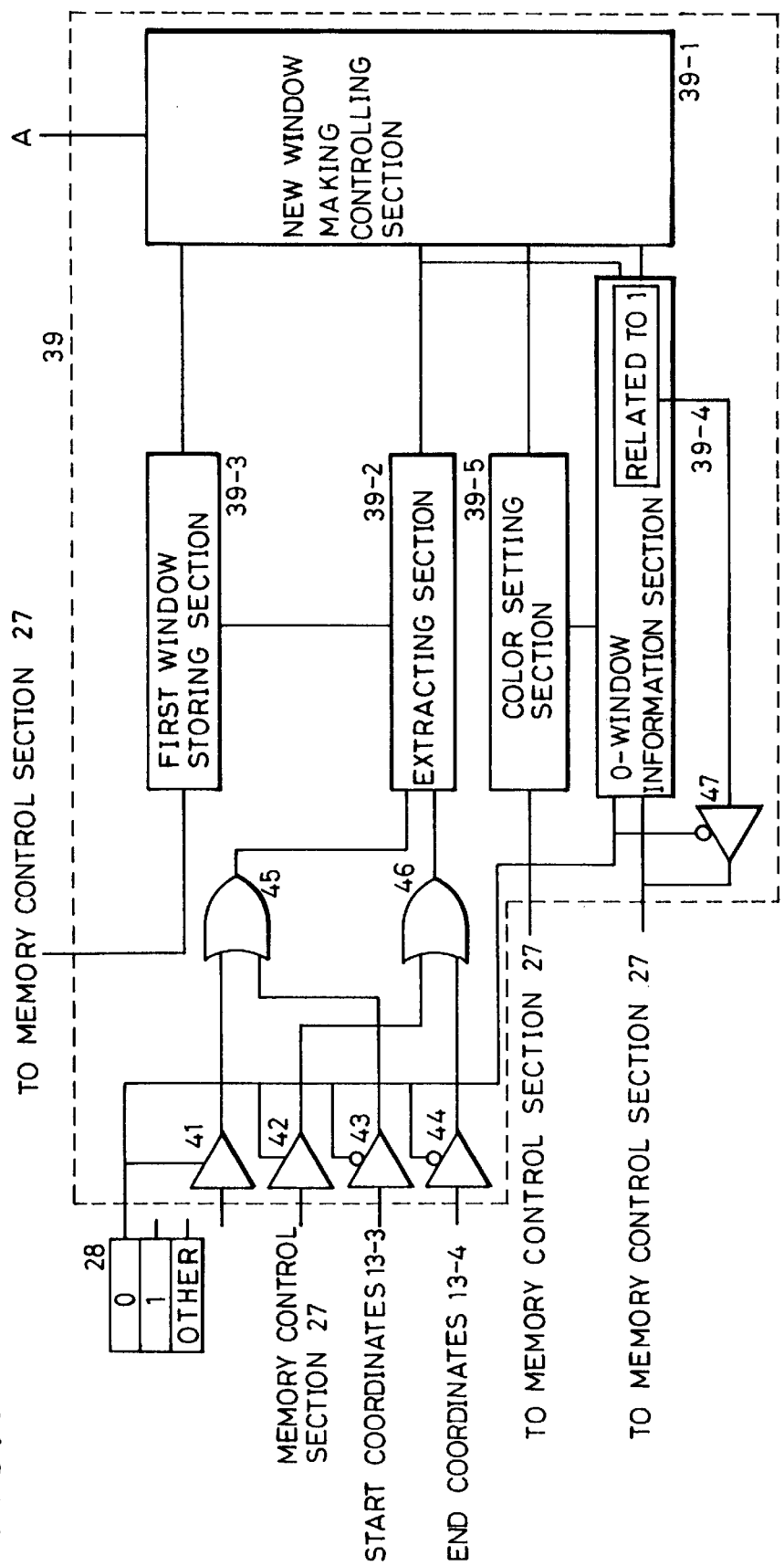
FIG. 6 is a detailed block diagram showing a new window making section of the information processing device of the first embodiment of the present invention.

The following will describe in detail the process carried out in the new window making section 39 referring to the detailed block diagram of FIG. 6.

The new window making section 39 is provided in order to (1) make a 0-rank window from a 1-rank window and (2) update display information of the 0-rank window in response to the movement of the 0-rank window.

As described above, when the 1-rank window is selected after pointing the function key 14, the signal A is outputted from the AND circuit 32 to a new window making controlling section 39-1 provided in the new window making section 39.

Supposing that the 1-rank window is selected after pointing the function key 14, and a range of the 1-rank window is specified by the pen 10, here, since the 1-rank window is selected, no signal is outputted from the 0-rank part of the window selecting section 28. This closes a gate 41 and a gate 42, and opens a gate 43 and a gate 44.

The gate 43 and the gate 44 respectively receive the start coordinates and the end coordinates, which are coordinates information of the range specified by the pen 10, from the start coordinates storing section 13-3 and the end coordinates storing section 13-4, respectively. The start coordinates and the end coordinates are then outputted to an extracting section 39-2 via an OR circuit 45 and an OR circuit 46, respectively.

A first window storing section 39-3 stores display information of the 1-rank window, and the extracting section 39-2 extracts from the first window storing section 39-3 the 1-rank window display information within a coordinates range (range of a rectangle whose upper left apex and bottom right apex are the start coordinates and the end coordinates, respectively) specified by the start coordinates and the end coordinates respectively outputted from the OR circuits 45 and 46. The display information thus extracted is then sent to a 0-window information section 39-4.

The 0-window information section 39-4, in order to specify the window from which the display information has been extracted, sets related information to "related to 1", and stores the related information in a related information storing part of the 0-rank window information storing section 13-2a via the memory control section 27. Here, the color information of the current 1-rank window and the color information of the 0-rank window are set so as to have the same color.

The following will describe the case where a signal is outputted from the 0-rank part of the window selecting section 28 (i.e., the case when the 0-rank window is selected).

When the 0-rank window is selected, a signal is outputted from the 0-rank part of the window selecting section 28. This opens the gate 41 and the gate 42. The gate 41 and the gate 42 respectively receive coordinates information from the 0-rank window information storing section 13-2a, and updating of the display information of the 0-rank window is carried out in response to the movement, enlargement, and reduction thereof in accordance with the coordinates information.

The operation of updating the display information of the 0-rank window is the same as the afore-described operation of making the 0-rank window except that (1) the display information of the 1-rank window, when the 0-rank window is made, is held without updating the memory contents of the first window storing section 39-3 and (2) the gate 47 is closed so that related information is not updated.

Figure 7:
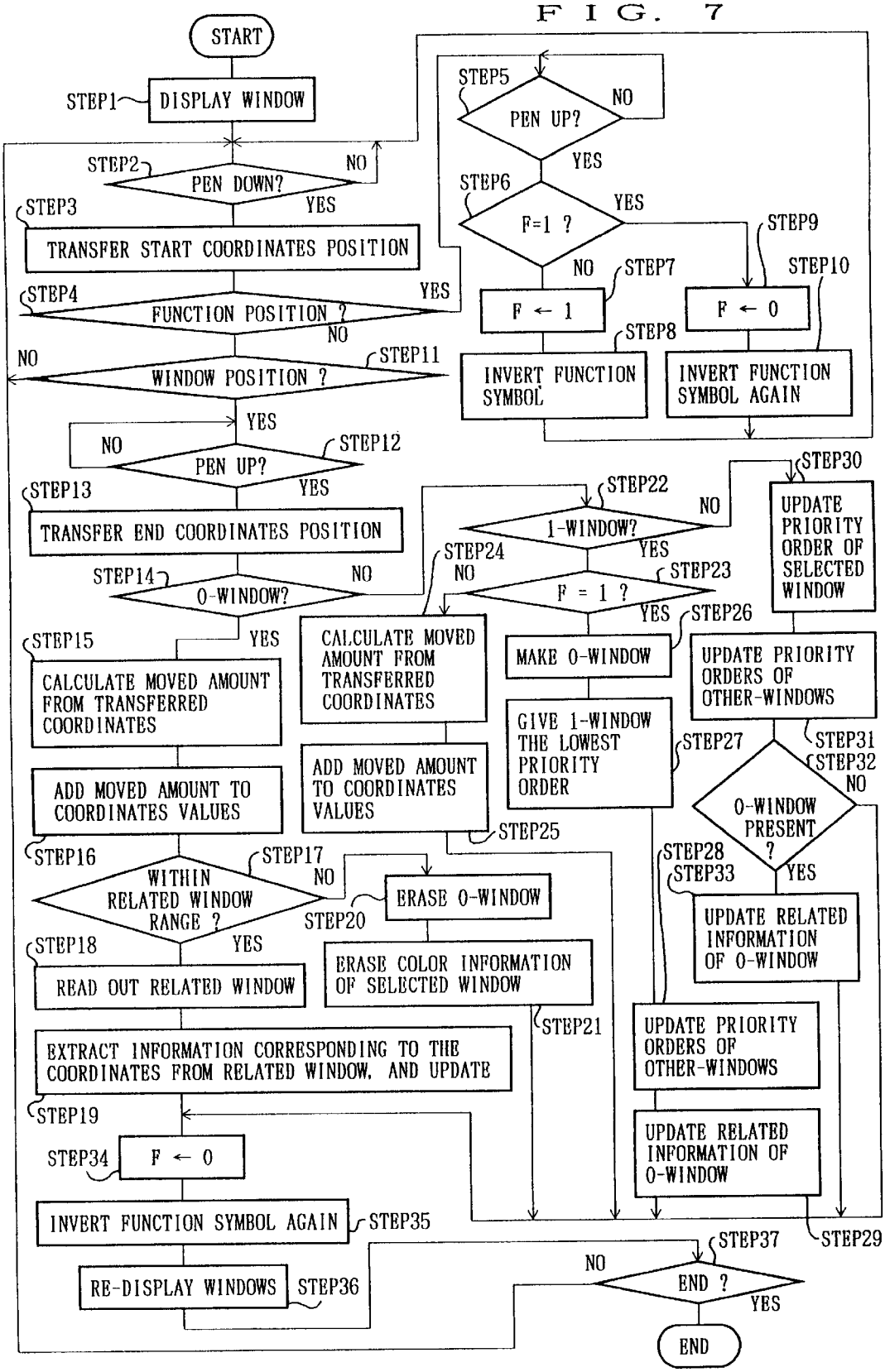
FIG. 7 is a flowchart showing a window displaying process of the information processing device of the first embodiment of the present invention.

The following will describe the above-described operation of the present information processing device according to the flowchart of FIG. 7.

First, in STEP 1, each window is displayed on the input-output section 2, and the input-output section 2 waits in STEP 2 until the input-output section 2 is touched by the pen 10. When the pen 10 comes in touch with the input-output section 2, in STEP a 3, the position on the input-output section 2 touched by the pen 10 is inputted to the start coordinates storing section 13-3 of the RAM 13 so as to be temporarily stored as a start coordinates position.

Then, in STEP 4, it is judged whether the position touched by the pen 10 is on the function key 14. If it is judged in STEP 4 that the position touched by the pen 10 is not on the function key 14, the sequence goes to STEP 11. If it is judged in STEP 4 that the position touched by the pen 10 is on the function key 14, the input-output section 2 waits in STEP 5 until the pen 10 loses the touch with the input-output section 2.

When the pen 10 loses the touch with the input-output section 2 in STEP 5, it is judged in STEP 6 whether a function flag F13-5 in the RAM 13 is "1". If it is judged in STEP 6 that the function flag F13-5 in the RAM 13 is not "1", the function flag F13-5 is set to "1" in STEP 7, and a symbol representing the function key 14 is inverted in STEP 8. Thereafter, the sequence returns to STEP 2.

If it is judged in STEP 6 that the function flag F13-5 in the RAM 13 is "1", the function flag F13-5 is set to "0" in STEP 9, and the symbol representing the function key 14 is inverted in step 10. Thereafter, the sequence returns to STEP 2.

If it is judged that the coordinates touched by the pen 10 are not on the function key 14, it is judged in STEP 11 whether the position touched by the pen 10 is on the windows. If the position touched by the pen 10 is not on the windows, the sequence returns to STEP 2. If the position touched by the pen 10 is on the windows, the input-output section 2 waits in STEP 12 until the pen 10 loses the touch with the input-output section 2.

If it is judged in STEP 12 that the pen 10 loses the touch with the input-output section 2, in STEP 13, the coordinates where the pen 10 lost the touch are inputted to the end coordinates storing section 13-4 of the RAM 13 so as to be temporarily stored as an end coordinates position. Thereafter, in STEP 14, it is judged whether the coordinates touched by the pen 10 are on the 0-rank window 18, and if it is judged in STEP 14 that the coordinates touched by the pen 10 are not on the 0-rank window 18, the sequence goes to STEP 22.

If it is judged in STEP 14 that the coordinates touched by the pen 10 are on the 0-rank window 18, in STEP 15, a moved amount is calculated from the difference of the start coordinates and the end coordinates respectively transferred in STEP 3 and STEP 13. Thereafter, in STEP 16, the moved amount thus calculated in STEP 15 is added to the coordinates values of the 0-rank window 18. Note that, in the case where the coordinates touched by the pen 10 are on a corner or on the frame of the 0-rank window 18, in STEP 15 and STEP 16, changing of the size of the 0-rank window 18 is carried out instead of moving the 0-rank window 18.

Then, in STEP 17, it is judged whether the coordinates touched by the pen 10 are within the range of the related window 17 (see FIG. 4) related to the 0-rank window 18, and if it is judged in STEP 17 that the coordinates touched by the pen 10 are not within the range of the related window 17, the sequence goes to STEP 20.

If it is judged in STEP 17 that the coordinates touched by the pen 10 are within the range of the related window 17, information of the related window is read out in STEP 18. Thereafter, in STEP 19, data corresponding to the coordinates touched by the pen 10 are extracted from the related window information, and the contents of the 0-rank window information 13-2a in the window information storing section 13-2 of the RAM 13 are updated.

If it is judged in STEP 17 that the coordinates touched by the pen 10 are not within the range of the related window 17, the 0-rank window is erased in STEP 20, and the color information of the selected window is erased in STEP 21.

If it is judged in STEP 14 that the coordinates touched by the pen 10 are not on the 0-rank window, in STEP 22, it is judged whether the 1-rank window is selected, namely, it is judged whether the coordinates touched by the pen 10 are on the 1-rank window.

If it is judged in STEP 22 that the coordinates touched by the pen 10 are not on the 1-rank window, the sequence goes to STEP 30. On the other hand, if it is judged in STEP 22 that the coordinates touched by the pen 10 are on the 1-rank window, in STEP 23, it is judged whether the function flag F13-5, which indicates whether or not the function key 14 is pressed, is set to "1".

If it is judged in STEP 23 that the function key 14 is not pressed, in other words, when the function flag F13-5 is not "1", in STEP 24, a moved amount is calculated from the coordinates which have been transferred beforehand. Thereafter, in STEP 25, the moved amount thus calculated is added to the coordinates values of the selected window in the window information storing section 13-2 of the RAM 13. Note that, in the case where the coordinates touched by the pen 10 are on a corner or on the frame of the 1-rank window, in STEP 24 and STEP 25, changing of the size of the 1-rank window is carried out instead of moving the 1-rank window.

When the key 14 is pressed, in other words, the function flag F13-5 is "1", a 0-rank window is made in STEP 26. The process of making the 0-rank window will be described later in detail referring to the flowchart of FIG. 8.

Thereafter, in STEP 27, the priority order of the 1-rank window is changed so that the 1-rank window is given the lowest priority order ("3" in FIG. 4), and the priority orders of other-windows are changed by respectively subtracting "1". Then, in STEP 29, the related information of the 0-rank window information storing section 13-2a is updated to the priority order of the 1-rank window, which was changed in STEP 27; namely, the related information of the 0-rank window information storing section 13-2a is updated so as to have the priority order of a window which used to be the 1-rank window.

If the coordinates touched by the pen 10 are not on the 1-rank window, in STEP 30, the priority order of the selected other-window is updated to "1", and in STEP 31, the priority orders of the other-windows other than the selected other-window are updated by respectively adding "1". In STEP 32, it is judged whether a 0-rank window of which a related window is the selected window is present, and if it is judged in STEP 32 that the 0-rank window of which a related window is the selected window is not present, the sequence goes to STEP 34. If it is judged in STEP 32 that the 0-rank window of which a related window is the selected window is present, in STEP 33, the related information of the 0-rank window is updated by adding "1".

In step 34, the function flag F13-5 is set to "0", and in STEP 35, the function key symbol representing the function key 14 is inverted so as to obtain the initial display condition. Thereafter, in STEP 36, all the windows are re-displayed in accordance with the information in the window information storing section 13-2 of the RAM 13. Then, in STEP 37, it is judged whether the display of the windows and the editing process should be finished, and if it is judged that the display of the windows and the editing process should be finished, the device is entered in another mode or the display of the windows and the editing process are finished. If it is judged that the display of the windows and the editing process should not be finished, the sequence returns to STEP 2.

Figure 8:
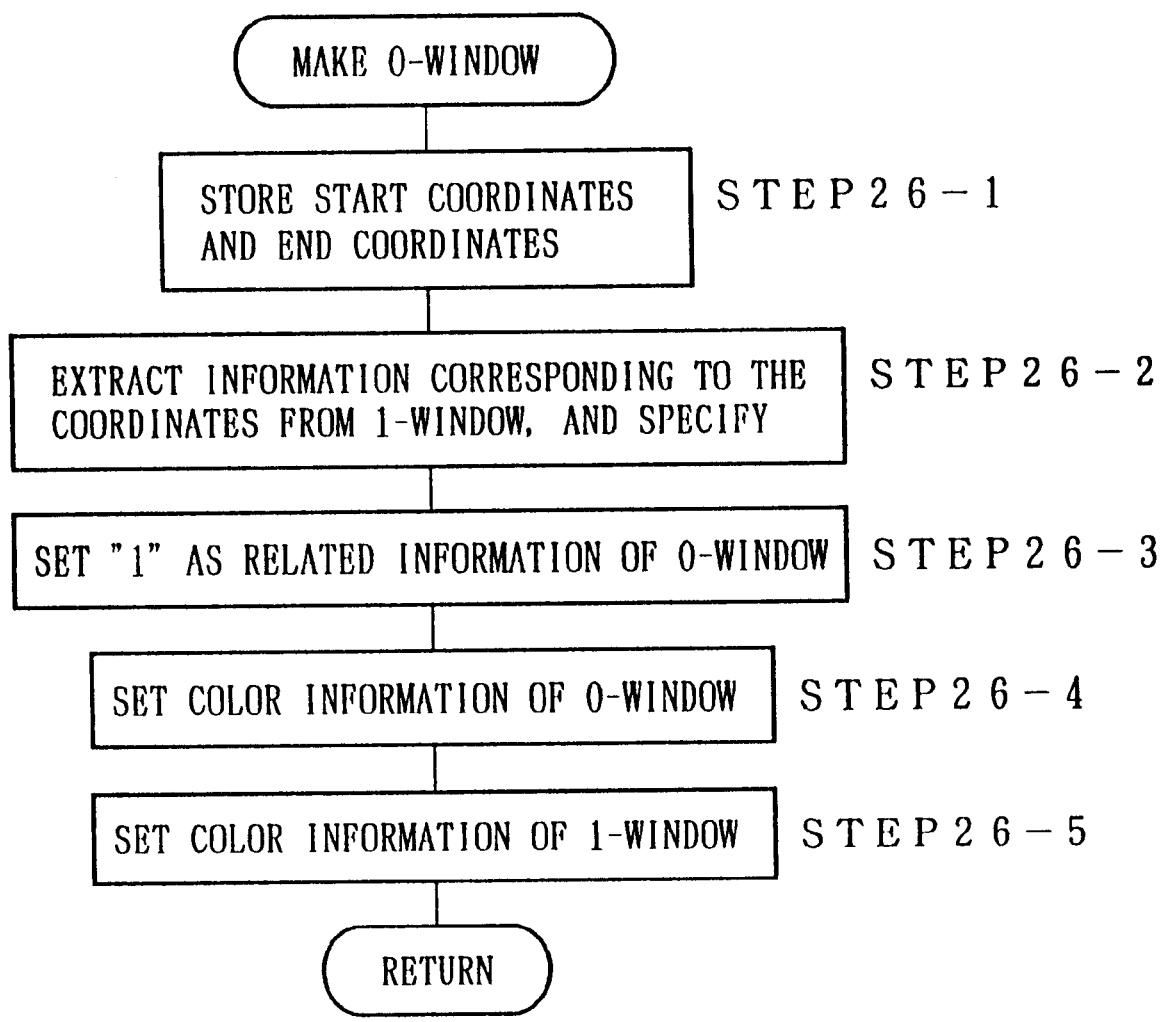
FIG. 8 is a flow chart showing a process for making a new window in the information processing device of the first embodiment of the present invention.
Figure 9:
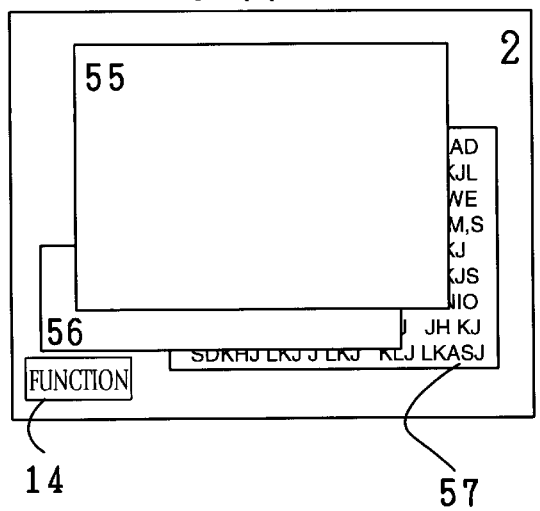
FIG. 9(a) through FIG. 9(e) are drawings explaining a window displaying process of an information processing device of second embodiment of the present invention.
Figure 9:
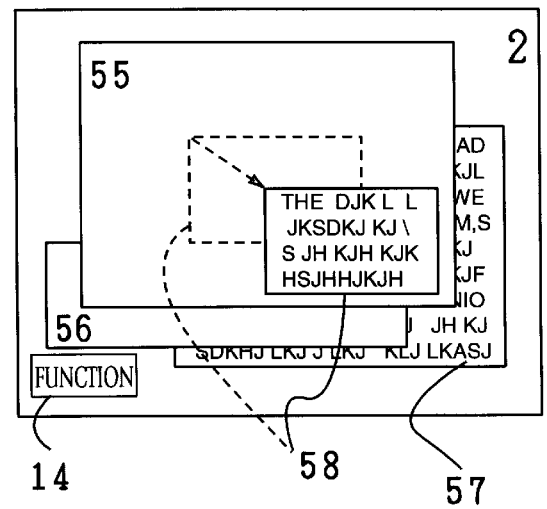
Figure 9:
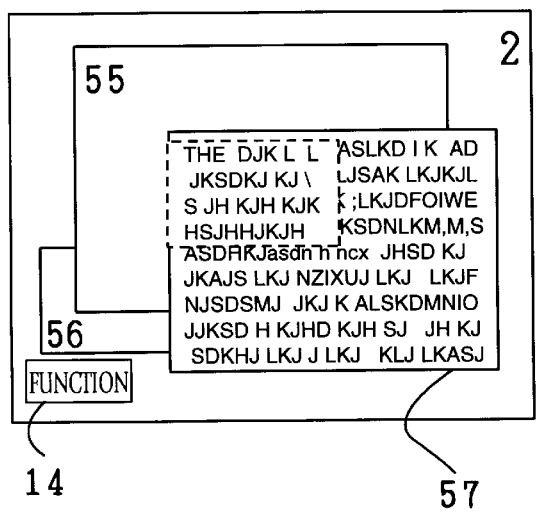
Figure 9:
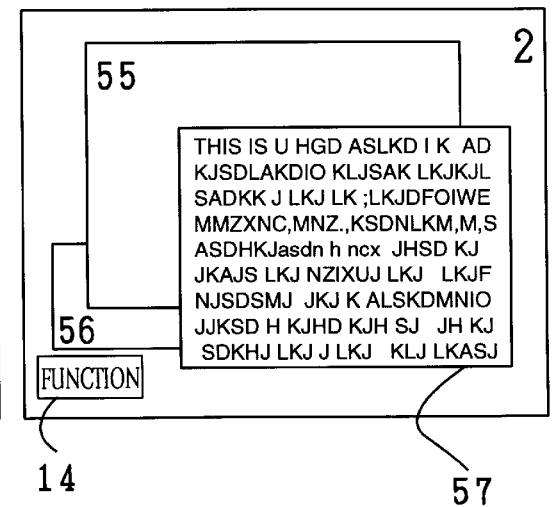
Figure 9:
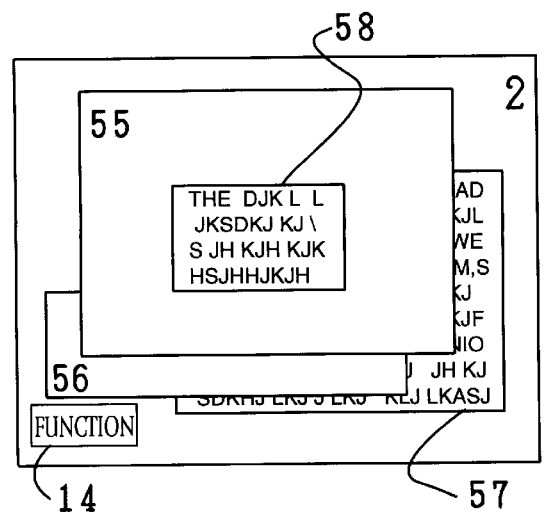

The following will describe the process for making the 0-rank window in STEP 26 of FIG. 7 referring to the flowchart of FIG. 8.

First, in STEP 26-1, (1) the start coordinates on the position touched by the pen 10 and (2) the end coordinates on the position on the input-output section 2 with which the pen 10 loses the touch are stored. In STEP 26-2, information corresponding to the coordinates range of STEP 26-1 is extracted from the 1-rank window information in the other-window information storing section 13-2b so as to store the information thus extracted in the 0-rank window information storing section 13-2a as the information of the 0-rank window.

Then, in STEP 26-3, "1" is set, as related information, in the 0-rank window information storing section of the window information storing section of the RAM 13, and in STEP 26-4, the color information of the 0-rank window is set to red. In STEP 26-5, the "red" set in STEP 26-4 is set as the color information of the related window in the other-window information storing section 13-2b of the window information storing section 13-2. Note that, in an initialized condition, "black" is set as the color information of all the windows.

By the described processes, it is possible to partially select a window to be referred to other than the active window so as to display, as a highest priority window, the selected window in front of all the other windows, thereby making it possible to easily carry out editing of data referring to a window which is not an active window.

Also, because the frame color of the highest priority window is set to a color (1) the same as the frame color of the window to be referred to and (2) different from the frame color of other windows, it is possible to easily recognize which window is partially referred as the highest priority window. [Second Embodiment]

The following will describe another embodiment of the information processing device having the described arrangement referring to FIG. 9(a) through FIG. 9(e) and FIG. 10 through FIG. 12.

FIG. 9(a) through FIG. 9(e) show a window displaying process of the present embodiment. FIG. 9(a) shows a display screen when a plurality of windows are opened. In the display screen, a window 55 is displayed in front of all the other windows, a window 56 is displayed behind the window 55, and a window 57 is displayed on the backmost side. Note that, in FIG. 9(a) through FIG. 9(f), displayed characters of the windows 55 and 56 are omitted.

Here, in the case where the user carries out editing of the window 55 referring to the data of the window 57 displayed on the backmost side, first, the window 57 to be referred to is touched by the pen 10 (see FIG. 1). The window 57 thus touched by the pen 10 is displayed in front. Then, the user presses a function key 14 displayed on the left bottom corner of the display screen of the input-output section 2, and as shown in FIG. 9(b), by dragging the pen 10, a portion of the window 57 is specified as a range to be referred to.

When the user finishes specifying the range by lifting the pen 10, as shown in FIG. 9(c), the window 57 is displayed on the backmost side behind all the displayed windows, and a new window 58, which is the portion of the window 57 specified as the range to be referred to, is displayed in front of the window 55 to be edited. Here, although not shown, the respective frame colors of the windows 57 and 58 are changed from black to red. The frame color of other windows remains black.

Also, here, because the window 55 is an active window, the user is able to edit the data of the window 55 referring to the data contents of the window 58.

When it is desired by the user to move the window 58 to another position while editing the data of the window 55 in FIG. 9(c), as shown in FIG. 9(d), the window 58 is dragged by the pen 10 so as to be moved.

In order to finish the reference to the window 58, the reference window 57 is touched by the pen 10. This, as shown in FIG. 9(e), displays the window 57 in front of all the other windows, and the window 58 which was taken out of the window 57 for reference is erased. The window 58 can also be erased by touching the function key 14 again.

Figure 10:
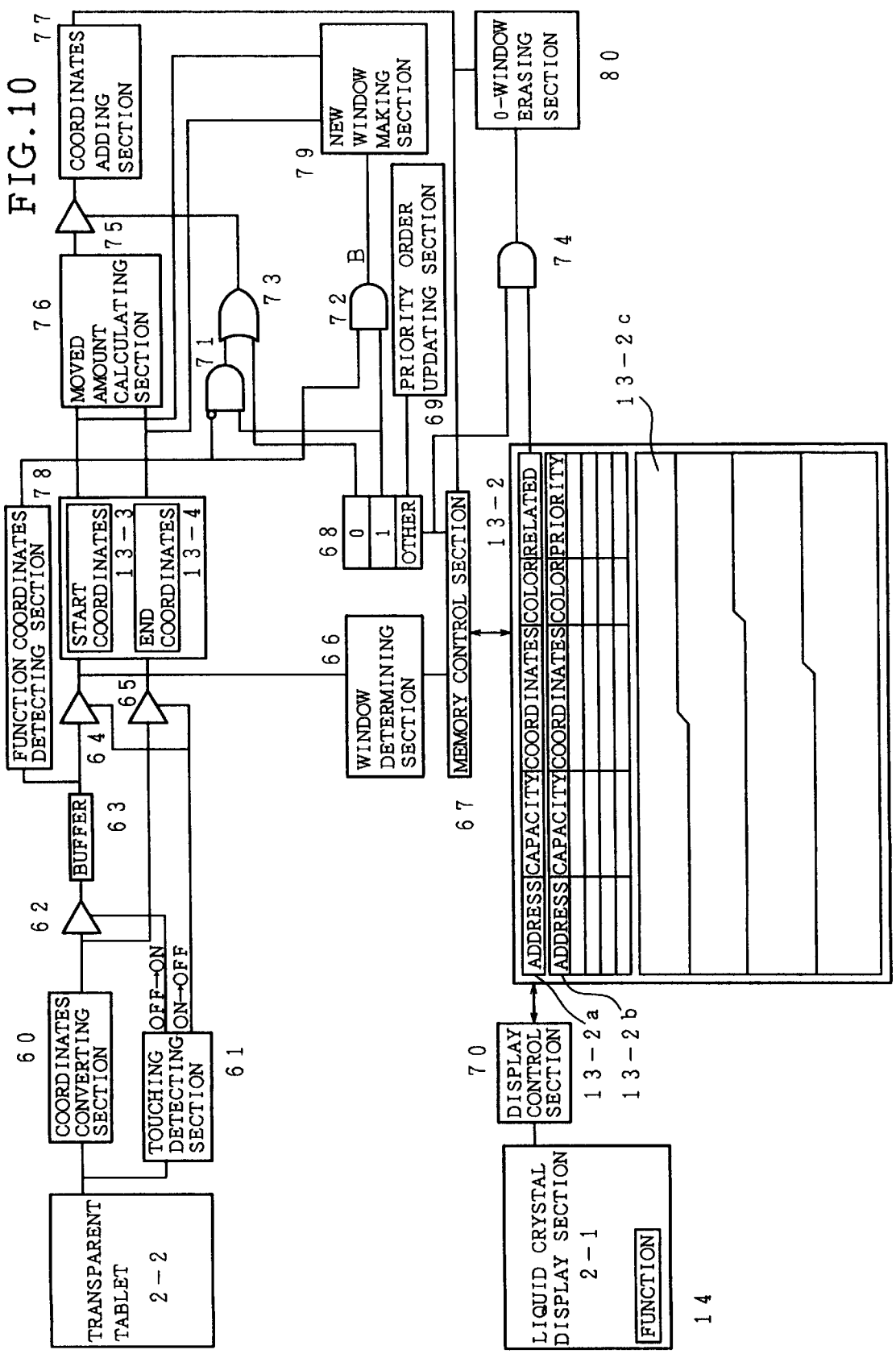
FIG. 10 is a detailed block diagram showing the information processing device of the second embodiment of the present invention.

The following will describe the described operations referring to the detailed block diagram of FIG. 10.

When the user touches the transparent tablet 2—2 with the pen 10 (see FIG. 1), the touched position is converted to coordinates by a coordinates converting section 60, and the coordinates thus converted are outputted to a gate 62. A touching detecting section 61, when the transparent tablet 2—2 is touched by the pen 10, outputs a signal to the gate 62. This opens the gate 62, and the coordinates obtained in the coordinates converting section 60 are outputted to a buffer 63 so as to be stored. Note that, in the present embodiment, the transparent tablet 2—2, the coordinates converting section 60, the touching detecting section 61, and the buffer 63 constitute region specifying means.

When the pen 10 loses the touch with the transparent tablet 2—2, the touching detecting section 61 opens a gate 64 so that the contents of the buffer 63 storing the coordinates on the transparent tablet 2—2 touched by the pen 10 are outputted to a window determining section (window determining means) 66. The window determining section 66 compares (1) the coordinates touched by the pen 10 and (2) the coordinates of each window stored in the window information storing section 13-2 of the RAM 13, which are read out by the memory control section (display information changing means) 67, so as to determine the window as specified by the user with the pen 10.

In the memory control section 67, when the window thus specified is an other-window, the priority order of the window information storing section 13-2 of the RAM 13 corresponding to the specified window is updated to "1", and the priority orders of windows other than the selected window are updated by respectively adding "1".

When the pen 10 loses the touch with the transparent tablet 2—2, the touching detecting section 61 outputs a signal to the gate 64 and a gate 65 so as to open the gates 64 and 65. The gate 64 thus opened allows the coordinates stored in the buffer 63 to be outputted to the start coordinates storing section 13-3. Also, the gate 65 thus opened allows the coordinates on the transparent tablet 2—2 from which the pen 10 lost the touch, obtained in the coordinates converting section 60, to be outputted to the end coordinates storing section 13-4.

The respective coordinates values of the start coordinates storing section 13-3 and the end coordinates storing section 13-4 are outputted to a moved amount calculating section 76. The moved amount calculating section 76 outputs a signal "0" when the difference of the start coordinates and the end coordinates is "0", and outputs the difference of the start coordinates and the end coordinates when the difference thereof is not "0".

When the function key 14 is not touched by the pen 10, a signal "0" is outputted to an AND circuit 71 from a function coordinates detecting circuit 78 so as to be inverted, and a signal "1" is outputted from the AND circuit 71. An OR circuit 73, upon receiving the signal "1", outputs the signal "1" to a gate 75 so that the gate 75 is opened. As a result, the difference of the start coordinates and the end coordinates respectively specified by the pen 10, detected by the moved amount detecting section 76 is outputted to a coordinates adding section 77. In the coordinates adding section 77, the difference of the start coordinates and the end coordinates is added to the coordinates of each window stored in the window information storing section 13-2 of the RAM 13 which are read out by the memory control section 67. As a result, the coordinates of each window are updated to the added value, and the windows are moved.

Then, a display control section 70 re-displays on the liquid crystal display section 2-1 the window which has been moved or changed, in accordance with the contents of the window information storing section 13-2 of the RAM 13 changed in the described manner.

Note that, in the present embodiment, the transparent tablet 2—2, the coordinates converting section 60, the touching detecting section 61, the buffer 63, the moved amount calculating section 66, and the coordinates adding section 67 constitute display changing means (window moving means, window size changing means) . Also, the liquid crystal display section 2-1 and the display control section 70 constitute displaying means.

The following will describe the operation when the function key 14 is pressed by the pen 10.

First, the coordinates stored in the buffer 63 are outputted to the function coordinates detecting section 78, and it is judged in the function coordinates detecting section 78 whether the position touched by the pen 10 is on the function key 14. If it is judged that the position touched by the pen 10 is on the function key 14, a signal "1" is outputted to the AND circuit 71 from the function coordinates detecting section 78 so as to be inverted, and a signal "0" is inputted to the AND circuit 71. Also, a signal is outputted to an AND circuit 72 from the function coordinates detecting section 78.

When the 0-rank window ("58" in FIG. 9) is pointed by the pen 10 after the function key 14 is touched, the 0-rank window is specified by the window determining section 66, and a signal "1" is outputted to the OR circuit 73 from the rank part of the window selecting section 68. This opens the gate 75 so that a moving process is carried out with respect to the 0-rank window. Here, the coordinates of the moved 0-rank window are stored in the "coordinates" part of the 0-rank window information storing section 13-2a of the window information storing section 13-2 of the RAM 13. Note that, in the present embodiment, the transparent tablet 2—2, the coordinates converting section 60, the window determining section 66, and the window selecting section 68 constitute selecting means.

When the 1-rank window (window 55 of FIG. 9(a) and FIG. 9(c), or window 57 of FIG. 9(b)) is pointed by the pen 10, the 1-rank window is specified by the window determining section 66, and a signal "1" is outputted to the AND circuit 72 from the 1-rank part of the window selecting section 68. The AND circuit 72 outputs a signal B to a new window making section 79 in accordance with (1) the signal from the function coordinates detecting section 78 and (2) the signal "1" from the rank part of the window selecting section 79. The new window making section 79 also receives the difference of the start coordinates and the end coordinates. In the new window making section 79, a process for making the 0-rank window is carried out. The process will be described in detail later referring to FIG. 11.

When an other-window (windows 56 and 57 of FIG. 9(a) and FIG. 9(c), or windows 55 and 56 of FIG. 9(b)), is pointed by the pen 10, the other-window is specified by the window determining section 66, and a signal "1" is outputted to a priority order updating section (controlling means, positioning means) 69 from the other rank part of the window selecting section 68. When the signal "1" is inputted to the priority order updating section 69, the priority order of the specified window stored in the other window information storing section 13-2b of the window information storing section 13-2 of the RAM 13 is set to "1", and the priority order of the 1-rank window is changed to "2".

A process, by the user, for erasing the 0-rank window as shown in FIG. 9(e) is as follows.

In the present information processing device, (1) the priority order of the specified window and (2) related information (information of a related window) of the 0-rank window information of the window information storing section 13-2 of the RAM 13 are outputted to the AND circuit 74. When (1) and (2) are coincident, the 0-window is erased by a 0-window erasing section (second window erasing means) 80.

Figure 11:
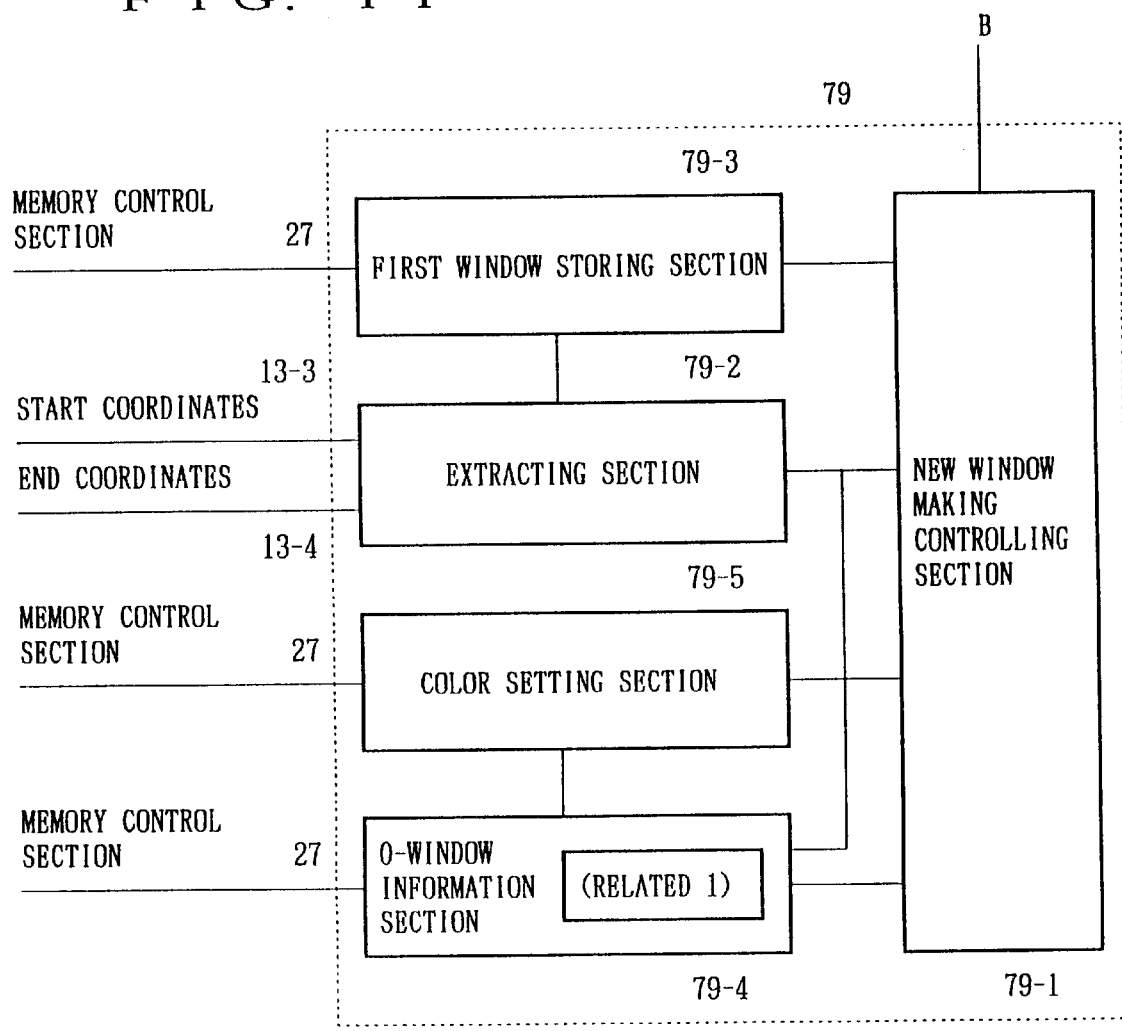
FIG. 11 is a detailed block diagram showing a process for making a new window in the information processing device of the second embodiment of the present invention.

The following will describe a process carried out in the new window making section 79 referring to the detailed block diagram of FIG. 11.

In the new window making section 69, upon receiving the signal B from the AND circuit 72, the priority order of the window touched by the pen 10 is set to "1" after the function key 14 is touched, and the window whose priority order is set to "1" in this manner is stored in the first window storing section 79-3 as a 1-rank window. The value stored in the first window storing section 79-3 remains as stored until another window is specified as the function key 14 is touched by the pen 10.

An extracting section 79-2 sets the window information of the first window storing section 79-3, including information of a window capacity and coordinates, in the 0-window information storing section 13-2a of the window information storing section 13-2 of the RAM 13. Here, in a color setting section 79-5, it is set so that the frame color of the specified window information stored in the otherwindow information storing section 13-2b of the window information storing section 13-2 is red, and it is set that the frame color of the 0-window information section 79-4 is also red. Note that, in an initialized condition, "black" is set as the color information of all the windows.

Figure 12:
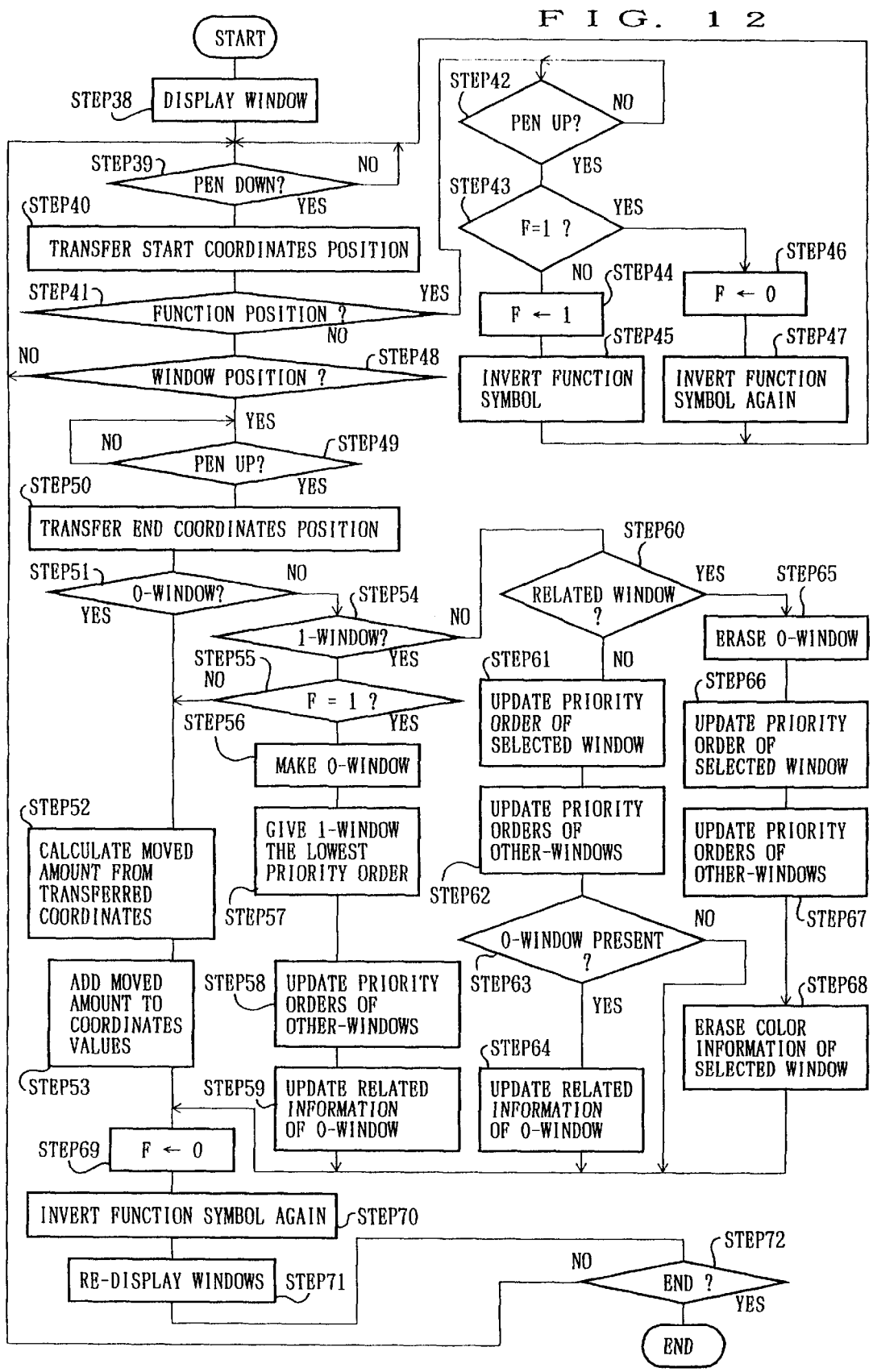
FIG. 12 is a flowchart showing the window displaying process of the information processing device of the second embodiment of the present invention.

The following will describe the operation of the new window making section 79 referring to the flowchart of FIG. 12.

Note that, since the processes of STEP 38 through STEP 50 of the present embodiment are the same as the processes of STEP 1 through STEP 13 in the flowchart of FIG. 7 of the first embodiment, explanations thereof are omitted.

In the present information processing device, after transferring the end coordinates in STEP 50, it is judged in STEP 51 whether the selected window is a 0-rank window. If it is judged in STEP 51 that the selected window is not a 0-rank window, the sequence goes to STEP 54. On the other hand, if it is judged in STEP 51 that the selected window is a 0-rank window, in STEP 52, a moved amount is calculated from the transferred coordinates. Thereafter, in STEP 53, the moved amount calculated in STEP 52 is added to the coordinates value of the window information storing section of the RAM 13, and the sequence goes to STEP 69. In the case where the coordinates touched by the pen 10 are on a corner or on the frame of the 0-rank window 18, in STEP 52 and STEP 53, the size of the 0-rank window 18 is changed instead of moving the 0-rank window 18.

If it is judged in STEP 51 that the selected window is not a 0-rank window, it is judged in STEP 54 whether the 1-rank window is selected. If it is judged that the selected window is not a 1-rank window, the sequence goes to STEP 60. On the other hand, if it is judged that the selected window is a 1-rank window, it is judged in STEP 55 whether the function flag F13-5, indicative of whether or not the function key 14 is pressed, is "1".

If it is judged in STEP 55 that the function key 14 is not pressed, in other words, when the function flag F13-5 is not "1", the sequence goes to STEP 52. On the other hand, if it is judged in STEP 55 that the function key 14 is pressed, in other words, when the function flag F13-5 is "1", a 0-rank window is made in STEP 56, and the 1-rank window is given the lowest priority order in STEP 57. In STEP 58, priority orders of other-windows are updated by respectively subtracting "1". Thereafter, in STEP 59, the related information of the 0-rank window information storing section 13-2a is updated to the priority order of the 1-rank window which was changed in STEP 57, namely, the related information of the 0-rank window information storing section 13-2a is updated so as to have the priority order of a window which used to be the 1-rank window, and the sequence goes to STEP 69.

If it is judged in STEP 54 that the selected window is not the 1-rank window, in STEP 60, it is judged whether the selected window is the related window of the 0-rank window. If it is judged in STEP 60 that the selected window is the related window of the 0-rank window, the sequence goes to STEP 65.

If it is judged in STEP 60 that the selected window is not the related window of the 0-rank window, in STEP 61, the priority order of the selected otherwindow is updated to "1", and in STEP 62, the priority orders of the other-windows are updated by respectively adding "1".

Then, in STEP 63, it is judged whether a 0-rank window of which a related window is the selected window is present, and if it is judged in STEP 63 that the 0-rank window of which a related window is the selected window is not present, the sequence goes to STEP 69. If it is judged in STEP 63 that the 0-rank window of which a related window is the selected window is present, in STEP 64, the related information of the 0-rank window is updated, and the sequence goes to STEP 69.

If it is judged in STEP 60 that the selected window is the related window of the 0-rank window, the 0-rank window is erased in STEP 65, and the priority order of the selected window is updated to "1" in STEP 66, and in STEP 67, the priority orders of the other-windows are updated by respectively adding "1". In STEP 68, the color information of the selected window is erased from the other-window information 13-2b of the window information storing section 13-2 of the RAM 13.

Note that, since the processes of STEP 69 through STEP 72 of the present embodiment are the same as the processes of STEP 34 through STEP 37 in the flowchart of FIG. 7 of the first embodiment, explanations thereof are omitted.

By the described processes, the user is able to select a window to be referred to which is not an active window so that it is possible to make a new window having the same information as that in the window region of the window to be referred to, and the display priority of the new window is given a highest priority and fixed; namely, it is possible to display the new window in front. This allows the user to easily use the information of the window to be referred to for editing (for example, moving) of an active window.

Also, because the frame color of the highest priority window is set to have a color (1) the same as the frame color of the window to be referred to and (2) different from the frame color of other windows, it is possible to easily recognize which window is partially referred as the highest priority window.

Note that, in the respective information processing devices of the first and second embodiment, as a pointing device (coordinates position pointing means) for selecting, moving, enlarging, compressing of the window, and for specifying of a region, the transparent tablet 2—2 integrated with the liquid crystal display section 2-1 is adopted. However, in order to display a pointer on the liquid crystal display section 2-1, it is possible adopt an arrangement wherein the information processing device of the present invention is provided with, instead of the transparent tablet 2—2, other pointing devices such as a tracking pad, a tracking ball, a mouse, or a separate tablet from the liquid crystal display section 2-1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information processing device comprising:

storing means for storing information about a plurality of windows;

window controlling means for controlling priority orders of the windows stored in said storing means;

displaying means for displaying the windows stored in said storing means in accordance with a control by said window controlling means;

selecting means for arbitrarily selecting a window from the windows displayed on said displaying means;

making means for specifying a display region of the window selected by said selecting means, and for making a highest priority window from the specified region;

positioning means for positioning the window selected by said selecting means, behind all the other displayed windows;

display changing means for changing a display position or a display region of the highest priority window as prepared by said making means;

display information changing means for changing, in response to a change in the display position or a change in the display region of the highest priority window by said display changing means, display information of the highest priority window in accordance with display information of the window as positioned behind all the other displayed windows by said positioning means; and erasing means for erasing a display of the highest priority window in response to the change by said display changing means when the display region of the highest priority window protrudes at least partially from a display region of the window positioned behind all the other displayed windows by said positioning means.

2. The information processing device as set forth in claim 1, wherein (1) the highest priority window and (2) the window as positioned behind all the other displayed windows by said positioning means have a same frame color.

3. An information processing device comprising:

multi-window displaying means for displaying, on a display screen of a display, a plurality of windows including an active window;

selecting means for selecting a window other than the active window, as a reference window to be referred to when editing the active window;

region specifying means for specifying a partial region of the reference window as selected by said selecting means;

making means for making, in front of the active window, a new window which displays information of the specified region of the reference window in accordance with the specification by said region specifying means;

window moving means for moving the new window; and window erasing means for erasing the new window when at least a part of the new window does not overlap the reference window, in accordance with moving of the new window by said window moving means.

4. The information processing device as set forth in claim 3, further comprising:

positioning means for positioning the reference window behind all the other displayed windows in accordance with the specification by said region specifying means.

5. The information processing device as set forth in claim 8, further comprising:

window size changing means for changing a size of the new window.

6. The information processing device as set forth in claim 3, wherein frame colors of the new window and the reference window are set to a same color which is different from a frame color of windows other than the new window and the reference window.

7. The information processing device as set forth in claim 3, wherein said selecting means includes:

coordinates position specifying means for specifying a coordinates position on a screen; and window determining means for determining on which window the coordinates position as specified by said coordinates position specifying means is.

8. An information processing method comprising the steps of:

displaying the plurality of windows including the active window;

selecting a window other than the active window, as a reference window to be referred to when editing the active window;

specifying a partial region of the selected reference window;

making, in front of the active window, a new window which displays information of the specified region of the reference window in accordance with the specifying of the region;

moving the new window; and erasing the new window when at least a part of the new window does not overlap the reference window, in accordance with the moving of the new window in the moving step.

9. An information processing device comprising;

a storage device storing information about a plurality of windows;

a window controlling unit communicating with the storage device, the window controlling unit controlling priority orders of the windows stored in the storage device;

a display communicating with the storage device and with the window controlling unit via the storage device, the display displaying the windows stored in the storage device in accordance with a control by the window controlling unit;

a selecting unit operatively communicating with the display, the selecting unit enabling arbitrary selecting of a window from the windows displayed on the display;

making structure communicating with the selecting unit, the making structure specifying a display region of the window selected by the selecting unit and making a highest priority window from the specified region;

a positioning unit communicating with the selecting unit, the positioning unit positioning the window selected by the selecting unit behind all the other displayed windows;

display changing structure communicating with the making structure, the display changing structure changing a display position or a display region of the highest priority window as prepared by the making structure;

display information changing structure communicating with the display changing structure, the display information changing structure changing, in response to a change in the display position or a change in the display region of the highest priority window by the display changing structure, display information of the highest priority window in accordance with display information of the window as positioned behind all the other displayed windows by the positioning unit; and an erasing unit communicating with the display changing structure, the erasing unit erasing a display of the highest priority window, in response to the change by the display changing unit, when the display region of the highest priority window protrudes at least partially from a display region of the window positioned behind all the other displayed windows by the positioning unit.

* * * * *